US010863378B2

(12) United States Patent
Witte (10) Patent No.: US 10,863,378 B2
(45) Date of Patent: Dec. 8, 2020

(54) DYNAMIC FIDELITY MESSAGE COMPRESSION IN A LIVE SIMULATION ENVIRONMENT

(71) Applicant: THE BOEING COMPANY, Chicago, IL (US)

(72) Inventor: Craig Paxton Witte, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 75 days.

(21) Appl. No.: 16/214,018

(22) Filed: Dec. 7, 2018

(65) Prior Publication Data

US 2020/0187039 A1 Jun. 11, 2020

(51) Int. Cl.
*H04W 28/02* (2009.01)
*H04W 4/02* (2018.01)
*H04L 29/06* (2006.01)
*H04L 29/08* (2006.01)

(52) U.S. Cl.
CPC ....... *H04W 28/0226* (2013.01); *H04L 67/125* (2013.01); *H04L 67/38* (2013.01); *H04L 69/04* (2013.01); *H04W 4/027* (2013.01)

(58) Field of Classification Search
CPC .............. H04W 28/0226; H04W 4/027; H04L 67/125; H04L 67/38; H04L 69/04
See application file for complete search history.

(56) References Cited

U.S. PATENT DOCUMENTS

| 6,404,352 B1* | 6/2002 | Ichikawa | G01S 5/0027 |
| | | | 340/426.28 |
| 7,319,667 B1* | 1/2008 | Biederman | H04L 47/10 |
| | | | 370/230.1 |
| 2009/0003347 A1* | 1/2009 | Yang | H04W 28/06 |
| | | | 370/392 |
| 2018/0342106 A1* | 11/2018 | Rosado | G06T 19/20 |
| 2019/0261220 A1* | 8/2019 | Geywitz | G16H 40/67 |

OTHER PUBLICATIONS (IEEE), I. o. (2012). IEEE Standard for Distributed Interactive Simulation-Application Protocols 1278-1-2012. New York: Institute of Electrical and Electronics Engineers (IEEE).
SISO. (2011). Enumerations for Simulation Interoperabilty SISO-REF-010-2011.1. Orlando, FL: SISO.

* cited by examiner

*Primary Examiner* — Kevin C. Harper
*Assistant Examiner* — Derrick V Rose
(74) *Attorney, Agent, or Firm* — Patterson + Sheridan, LLP (57) ABSTRACT

Techniques for message data compression in a live simulation environment are described. A message is compiled at a computing entity in a live simulation environment. The computing entity then determines a position and an orientation of another entity that will received the message through an over-the-air network in the live simulation environment. The computing entity then determines a compression level for the message, based upon the position and orientation of the second entity, and flags the message with the compression level. To preserve the resources of the over-the-air network, such as network bandwidth, the computing entity compresses the message according to the compression level prior to sending the message to its destination in the live simulation environment.

20 Claims, 7 Drawing Sheets

DYNAMIC FIDELITY MESSAGE COMPRESSION IN A LIVE SIMULATION ENVIRONMENT

FIELD

The present disclosure relates to live simulation environments where multiple entities both real and simulated interact with each other to create a real time platform for live simulation such as conducting wargame activities, among other simulation activities. More specifically, the present disclosure is directed to efficient communication between the entities participating in a live simulation environment.

BACKGROUND

In live simulation environments, there are several types of entities including, live entities, virtual entities, and constructive entities. As used herein, a "live entity" refers to a real world platform, such as a plane, tank, boat, etc., which is piloted by a human. A "virtual entity" refers to a virtual trainer that simulates a real-world platform and is piloted by a human operator. A "constructive entity" refers to a computer-generated entity whose behavior is determined by a simulation program. Constructive entities can be generated on live platforms, virtual platforms, or any piece of computer hardware with a threat server.

A simulation environment can include any combination of the live, virtual, and/or constructive entities. When performing a simulation operation, these entities are in frequent communication with each other. Generally, the entities communicate over many different types of networks, but a live entity (e.g., a real-world aircraft controlled by a human operator) may rely on over-the-air communications, which typically are relatively limited in terms of bandwidth. As a large amount of data can be sent and received from each entity in a live simulation environment, these communication links can quickly become overloaded.

SUMMARY

Embodiments described herein include a method for message data compression. The method includes a method for message data compression including generating, at a first live entity, a first message destined for a second entity and determining, based upon a state vector corresponding to the second entity, a compression level for the first message, where the state vector contains at least a geographical location for the second entity. The method continues by compressing the first message according to the compression level and sending the compressed first message to the second entity. Other embodiments of this aspect include corresponding computer systems, apparatus, and computer programs recorded on one or more computer storage entities, each configured to perform the actions of the method.

Another embodiment described herein includes a system for message data compression. The system includes a processor and a memory storing a program, which, when executed on the processor, performs an operation The operation including generating, at a first live entity, a first message destined for a second entity and determining, based upon a state vector corresponding to the second entity, a compression level for the first message, where the state vector contains at least a geographical location for the second entity. The operation continues by compressing the first message according to the compression level and sending the compressed first message to the second entity.

Another embodiment described herein includes a computer program product for message data compression. The computer program product including a computer-readable storage medium having computer-readable program code embodied therewith, the computer-readable program code executable by one or more computer processors to perform an operation. The operation including generating, at a first live entity, a first message destined for a second entity and determining, based upon a state vector corresponding to the second entity, a compression level for the first message, where the state vector contains at least a geographical location for the second entity. The operation continues by compressing the first message according to the compression level and sending the compressed first message to the second entity.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

Embodiments described herein provide techniques for dynamically compressing data sent to and from a live entity in a live simulation environment. Generally speaking, conventional solutions do not take into account the data needs for each of the entities within a simulation environment, but rather may use a fixed amount of compression or no compression at all when sending data messages between entities within the environment. While described herein in relation to a live simulation environment, the embodiments may be applied to any computing entities or electronic entities that transmit communication between the entities on a repeated and/or ongoing basis.

Figure 1:
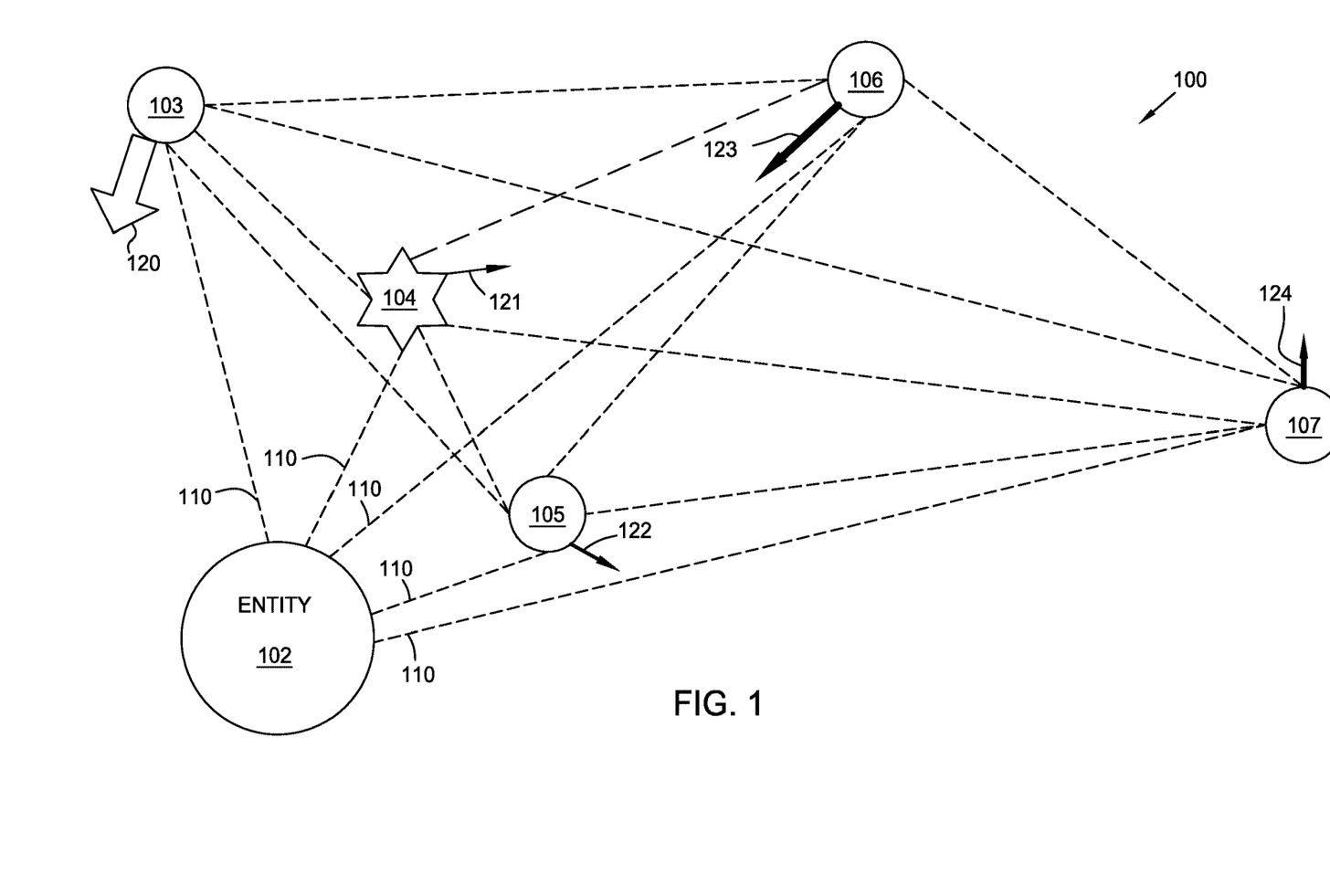
FIG. 1 is an illustration of a live simulation environment, according to one embodiment described herein.

FIG. 1 is an illustration of a live simulation environment, such as environment 100). As described herein, the environment 100 includes physical actors, entities, and other electronic/computing entities that are participating in a live simulation, where some aspect of the live simulation are computer generated and other aspects of the live simulation are controlled and/or generated by distinct separate actors both human and computer/machine. As shown, the environment 100 includes an entity 102 and simulation entities 103-107.

In some examples, the entity 102 is a live entity in the environment 100 and is in communication with one or more other live entities, one or more other types of entities (e.g., one or more of the simulation entities 103-107) and/or in communication with a server hosting one or more constructive entities (e.g., one or more of the simulation entities 103-107). As used herein, a "live entity" refers to a real world platform, such as a plane, tank, boat, etc., which is piloted by a human and in communication. In another example, the entity 102 is a server hosting one or more constructive entities (e.g., one or more of the simulation entities 103-107) and/or is in communication with one or more live entities (e.g., one or more of the simulation entities 103-107). In any example, the entity 102 is in communication with a live entity and thus seeks to minimize the amount of traffic sent in an over-the-air network as described herein.

In some examples, the environment 100 is an Integrated Live Virtual and Constructive training system and includes live entities, virtual entities, and constructive entities. In a particular embodiment, the entities can include aerial entities (e.g., aircrafts, drones, missiles, etc.), ground-based entities (e.g., tanks, armored vehicles, unmanned ground vehicles, etc.), and other types of entities participating in a simulation in environment 100.

In one embodiment, at least the entity 102 maintains a separate representation of the simulation environment, with each separate representation of the environment including a representation of the location of the entity 102 and the simulation entities 103-107. In some examples, hardware hosting the simulation entities 103-107 also maintain a separate representation of the environment 100. In maintaining such representations, Embodiments can maintain a state vector for each entity represented within the simulation environment. Such a state vector could include data associated with the various entities can also be maintained, such as a current position of the entity (e.g., represented as a set of geolocation coordinates), a current velocity of the entity, a current measure of acceleration of the entity, a measure of angular acceleration 120-124, etc. In the depicted embodiment, the direction and magnitude of the velocity is represented by the direction and length of the arrows representing velocity and acceleration 120-124. The acceleration is represented by the thickness of the arrows representing velocity and acceleration, where a solid arrow indicates a positive acceleration and a non-solid arrow represents negative acceleration. As also shown, entities 103, 105-107 have neutral entity statuses. Entity 104 currently has a targeting status. For example, entity 104 may be targeting another entity in the environment 100, such as entity 102. The entity statuses are also included in the state vector of the entity In some examples, the environment 100, including entity 102 and the simulation entities 103-107 may use a modified version of the Distributed Interactive Simulation (Institute of Electrical and Electronics Engineers (IEEE)-1278.1) standard as a network protocol for communication between the any of the entities that are live entities. The network protocol may utilize over-the-air (OTA) or wireless communications in a network 110 to transmit data to the live entities in the simulation including to/from the entity 102. The communication between each of the entities include simulation protocols, in messages broadcast to the entities in the environment 100 (as described in relation to FIG. 3). The messages may contain the state vector information of the entities in the environment 100, in addition to other information such as entity identification information, entity status information, and general simulation information. The messages are generally sent at regular time intervals or a heartbeat of the simulation, in order to keep the entities up to date on the various locations of the other entities in the environment 100 and to ensure proper execution of the simulation. In some examples, the message may be sent at a more frequent time interval than the heartbeat of the simulation if the entities in the environment 100 are maneuvering in a way that requires more frequent messaging.

Figure 2:
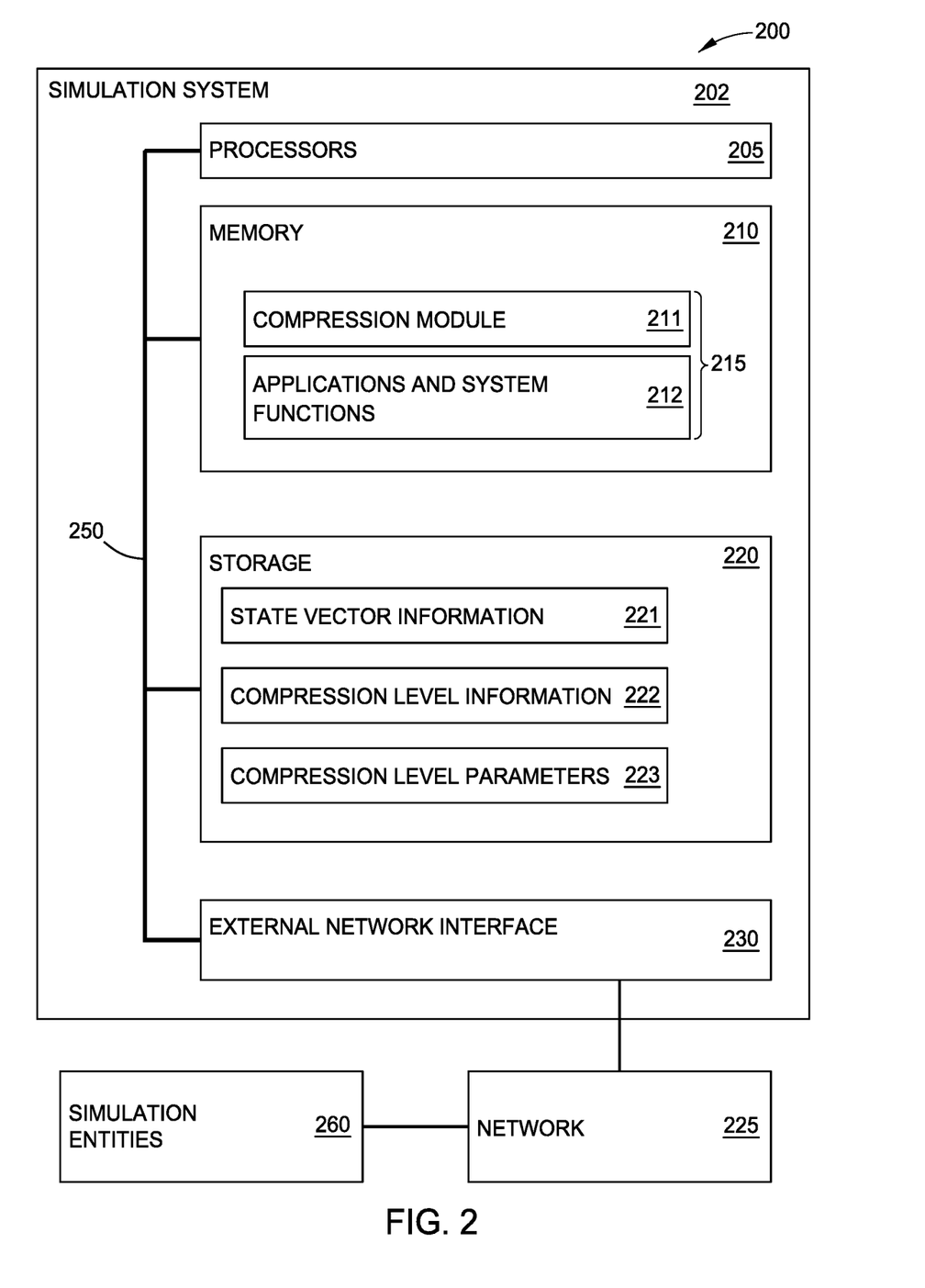
FIG. 2 is a block diagram illustrating a simulation system, according to one embodiment described herein.

As a simulation is executed in the environment 100, the entities can transmit messages to the other entities participating in the simulation. For example, entity 102 transmits and receives messages to each of the simulation entities 103-107. Generally speaking, while the simulated entities 260 may be able to communicate with one another using relatively high-speed networks (e.g., Ethernet communications), the system 202 may rely on an OTA network, such as network 255 which is relatively limited in bandwidth for communicating with the simulated entities 260. Particularly in conventional systems, such network limitations ultimately limit the size and complexity of the simulation running in the environment 100.

According to one embodiment described herein, the fidelity of the information that the entity 102 (and each other hardware hosting the entities) sends can be adjusted based on the relevance of a priority entity to the entity 102, whether the entity 102 is a live entity or is a server in communication with a live entity. For example, if the entity 107 is not a targeting entity, is at distance relative to entity 102 that exceeds a predefined threshold distance, embodiments could determine that the data to be broadcast in a message from the entity 102 (e.g., position and orientation information of entity 102) does not need a high level of fidelity (e.g., some data loss or loss of data granularity in compression is acceptable), if the entity 107 is the priority entity. Thus a high level of data compression can be used to compress the data of the messages broadcast from the entity 102. For example, when the entity 102 needs to broadcast its position and orientation data, the entity 102 can compress its three dimensional and granular position information to less granular position information, prior to sending the data to entity 107.

As another example, embodiments could determine that entity 105 is the priority entity and is much closer to entity 102, and as a result could determine to use a lower level of compression to ensure a higher level of data fidelity and to ensure the simulation can continue executing properly. In such an example, the entity 102 may transmit some data values without using compression (e.g., position and orientation). The dynamic changing of the fidelity of the compressed data in the messages sent between each entity of environment 100 allows for bandwidth in network 110 to be conserved, which in turn allows for more entities to join the simulation in environment 100 and an increased complexity of the simulations executing in environment 100.

As discussed above, for inter-entity communications using higher bandwidth networks (e.g., an Ethernet network), the entities may send uncompressed data as bandwidth on such networks is generally less limited. For example, if entity 103 and entity 106 are virtual and/or constructive entities, a large bandwidth network may be utilized to transmit simulation messages between the hardware hosting the entities such that compression is not needed.

In an example where the entity 102 is a server hosting constructive entities, it may ignore any of the constructive entities hosted on the server in the determination of a priority entity for compression. For example, if entities 103, 104, 105, and 106 are all constructive entities hosted on the server also hosting entity 102, the server may ignore the other constructive entities and determine that a live entity 107 is the priority entity for compression determination.

FIG. 2 is a block diagram illustrating a simulation system. As shown in FIG. 2, the arrangement 200 may include a server embodied as server/computer/router or simulation system, such as system 202, which is configured to execute a simulated live entity, such as entity 102 in environment 100 shown in FIG. 1, and perform the methods described herein. The system 202 is shown in the form of a general-purpose computing device. While described herein in relation to system 202, arrangement 200 may be individually embodied as hardware hosting and/or executing each of the entities 102-107 shown in FIG. 1 and any other simulated entity executing a simulation in the environment 100. The components of system 202 may include, but are not limited to, one or more processing units and/or processors 205, a system memory, such as memory 210, a storage system 220, a bus 250 that couples various system components including the memory 210 and storage system 220 to processors 205 along with an external network interface, such as interface 230 and an input/output interface. In some embodiments, arrangement 200 is distributed and includes a plurality of discrete computing devices that are connected through wired or wireless networking. The system 202 uses the interface 230 to communicate over network 255 (e.g., network 110) with each of the other entities 260 (e.g., the hardware hosting the entities) that are executing in an environment 100.

Memory 210 may include a plurality of program modules 215 for performing various functions related to message data compression in a live simulation environment, described herein. The program modules 215 generally include program code that is executable by one or more of the processors 205. As shown, program modules 215 include compression module 211 and applications and system functions module 212. Additionally, storage system 220 may include media for storing state vector information 221, compression level information 222, compression level parameters 223, and other information. The information stored in storage system 220 may be updated and accessed by the program modules 215 described herein.

Figure 3:
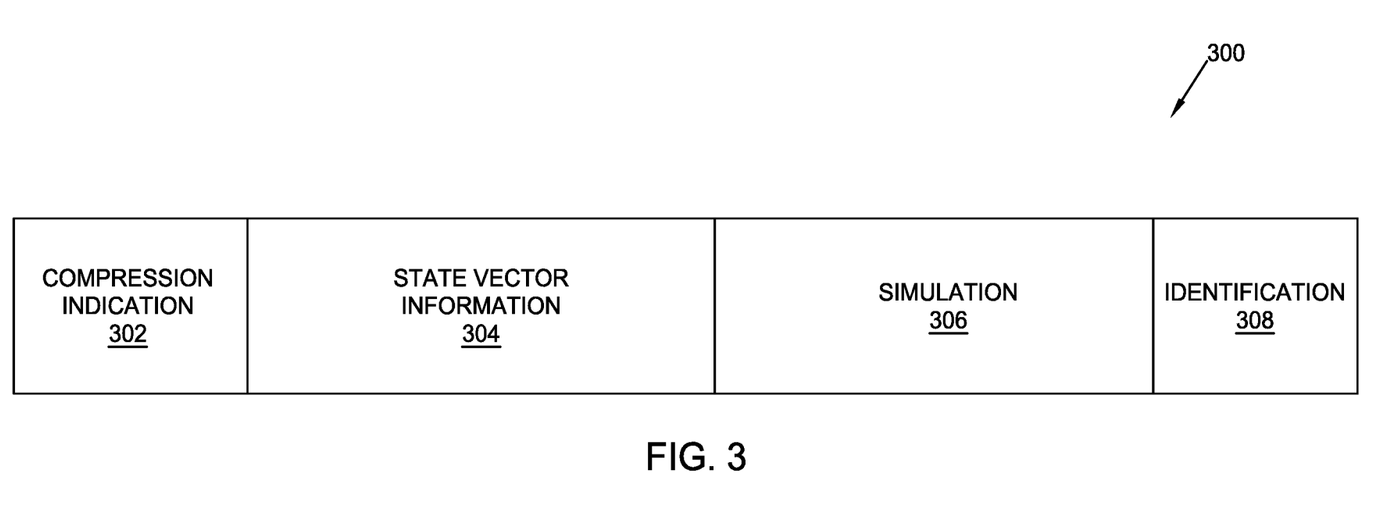
FIG. 3 is an illustration of a data message in a live simulation environment, according to one embodiment described herein.

FIG. 3 is an example illustration of a data message in a live simulation environment. For example, the message 300 is a message compiled and sent from entity 102 to another entity in the environment 100. As shown, the message 300 includes multiple types of data including a compression indication 302, state vector information 304, simulation information 306, and identification information 308, among various other data. In some examples, the message 300 is a modified DIS Protocol Data Unit (PDU).

Figure 4:
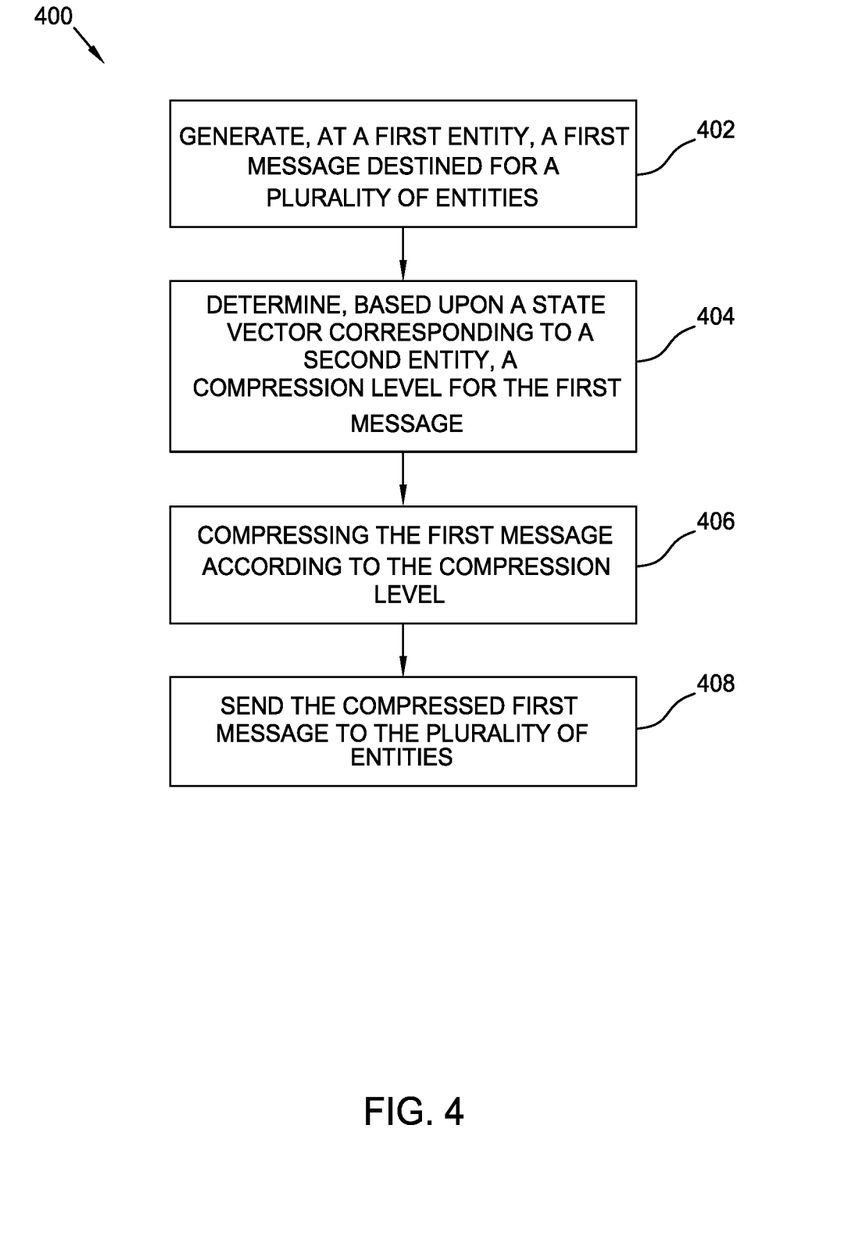
FIG. 4 is a flowchart illustrating message data compression in a live simulation environment, according to one embodiment described herein.

FIG. 4 is a flowchart illustrating message data compression in a live simulation environment, according to one embodiment described herein. While described in relation to entity 102, it should be understood that the methods described in FIGS. 4-9 may be executed by any computing device/hardware interacting with a live entity in the environment 100 shown in FIG. 1. For example, the system 202 may include a server hosting multiple constructive entities and in communication with a live entity. In another example, the system 202 is a live entity in communication with one or more other live entities and/or hardware systems hosting constructive entities. Method 400 begins at block 402, where the applications and systems functions module 212 generates, at a first live entity, a first message destined for a plurality of entities. In some examples, the first entity is a live entity such as entity 102, which will utilize OTA communications. In another example, the entity 102 is server hosting constructive entities, where the server is in communication with a live entity. In some examples, only one of the first entity or the plurality of entities is a live entity.

In some examples, the system 202 compiles a message for entity 102, such as message 300, destined for the plurality of entities in the environment 100. In the environment 100, the system 202 will simultaneously compile and broadcast messages, such as message 300 for the plurality of entities executing in the environment 100. The message may include state vector information 304 concerning entity 102 and/or the other entities in the environment 100. The message may also include simulation information 306, including a status of the entity 102 (e.g., targeting, neutral, damaged, etc.) and/or other entities in the environment 100. The message 300 may also include an identification of the entity such as an identification of entity 102, (e.g., a call sign or other static identification information). This process is discussed in more detail in relation to FIG. 5.

Method 400 continues at block 404, where the compression module 211 determines, at the system 202, based upon a state vector corresponding to a second entity, a compression level for the first message, where the second entity is a priority entity. For example, system 202 may determine from state vector information 221, that the entity 105 is a priority entity and has a certain position and a certain orientation relative to entity 102.

In some examples, the priority entity is an entity in the simulation that enables the system 202 to determine a compression level for messages sent to/from a live entity in the environment 100. In some examples, the system 202 determines which entity is a priority entity by determining which of the entities in a simulation are a constructive entity or a live entity. If the entity is a constructive entity hosted on the system 202 (performing as a constructive server), it can be ignored as not the priority entity. If the entity is constructive and hosted on hardware other than the system 202 (performing as a live entity), it may be grouped together with other entities hosted on that hardware and priority can be determined for the group of constructive entities. In some examples, the priority entity is also determined based on the location, targeting status, direction of movement, etc. as related to the system 202. The state vector information 221 includes the most recent position information of each entity in executing the simulation in environment 100. This process is discussed in more detail in relation to FIG. 6.

The determination of the compression level for the first message may also determine that entity 105 does not currently need a high level of data fidelity in the messages sent between the entity 102 and the entity 107. Thus a high level of data compression may be used since entity 105 only needs certain information about the entity 102. In another example, a higher level of data fidelity is needed, for example if the entity 102 and the entity 105 are closer together and more likely to interact or have the potential for interaction in the near future (such as within several system heartbeats). In another example, determining the compression level for the first message is further based on a system status of the second entity. For example, is a message is destined for entity 104, which is currently a targeting entity, the compression level may be decreased in order to ensure fidelity of the data at an active entity. This process is discussed in more detail in relation to FIG. 7.

At block 406, method 400 continues when the compression module 211 compresses the first message according to the compression level using compression level information 222. For example, entity 102 compresses the state vector information 304 in message 300 according to the compression level and the corresponding compression algorithms and methods stored in compression level information 222. The entity 102 may also compress the simulation information 306 and identification information 308 according to the compression level (or a different compression level in some examples described herein). This process is discussed in more detail in relation to FIG. 8. In some examples, the entity 102 also flags the message 300, with an indication of the compression level. This indication allows for the entity 107 to decompress the message according to the compression level upon receipt.

Method 400 continues at block 408, where the applications and systems functions module 212 sends the compressed first message to the second entity. For example, entity 102 transmits the compressed message 300 to the entity 107 using the OTA network. In some examples, the first message (the message 300) is compiled, compressed, and sent according to the heartbeat of the system, such as every 5 seconds.

Figure 5:
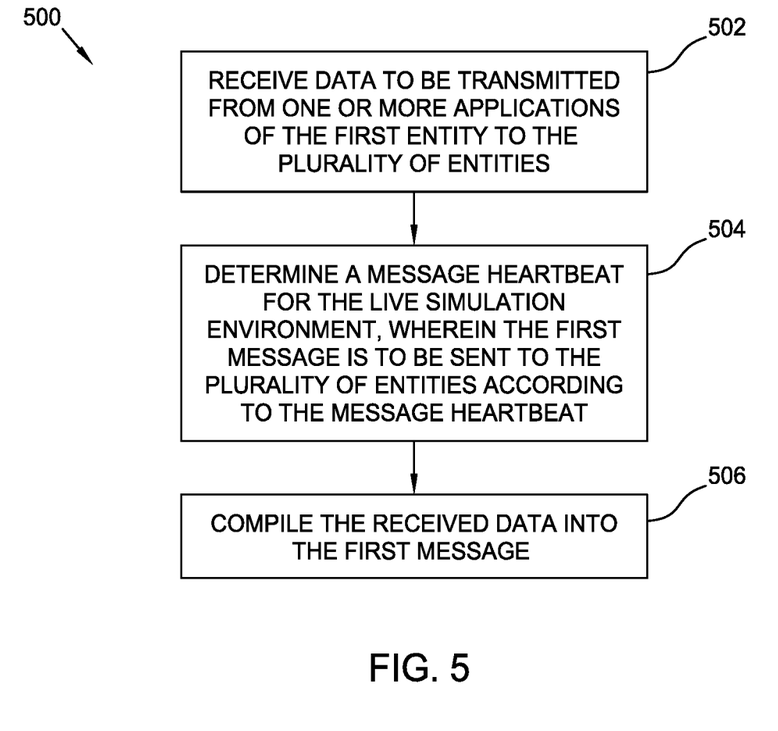
FIG. 5 is a flowchart illustrating compiling a message, according to one embodiment described herein.

FIG. 5 is a flowchart illustrating compiling a message, according to one embodiment described herein. In some examples, method 500 is a method for compiling the first message destined for the second entity, as described in relation to FIG. 4 block 402. Method 500 begins at block 502, where the applications and systems functions module 212 receives data to be transmitted from one or more applications of the first entity to the second entity. In some examples, the data may be received and/or determined at the applications and systems functions module 212 to include information related to the simulation executing in the environment 100 and entity 102's role in the simulation.

Method 500 continues at block 504, where applications and systems functions module 212 determines, a message heartbeat for the live simulation environment, where the first message is to be sent to the second entity according to the message heartbeat. For example, the simulation executing in the environment 100 may require that the messages sent between the entities be sent according to the message heartbeat every 5 seconds or another appropriate time.

Method 500 continues at block 504, where applications and systems functions module 212 compiles the received data into the first message. For example, the system 202 compiles the message 300 with the data compiled data. In some examples, the system 202 then compresses and transmits the message 300 in compliance with the message heartbeat or another appropriate time.

Figure 6:
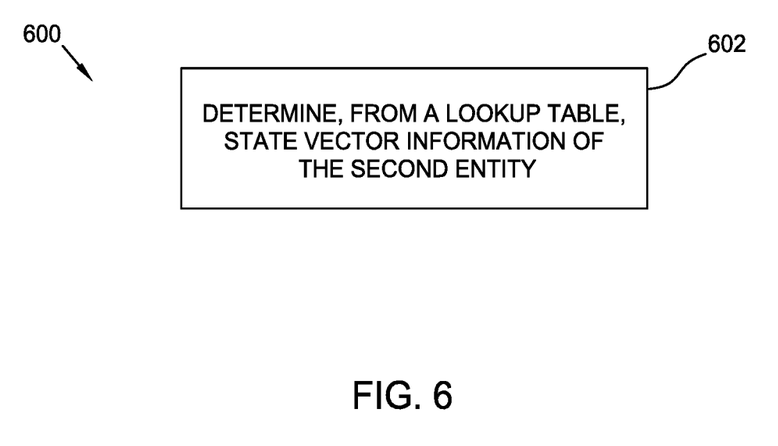
FIG. 6 is a flowchart illustrating determining a position and orientation of an entity, according to one embodiment described herein.

FIG. 6 is a flowchart illustrating determining a state vector of an entity, according to one embodiment described herein. In some examples, method 600 is a method for determining a state vector of the second entity, as described in relation to FIG. 4 block 404. Method 600 begins at block 602, where the compression module 211 determines, from a lookup table position information of the second entity, wherein the position information comprises a location of the second entity, a velocity of the second entity, an acceleration of the second entity, and an angular acceleration of the second entity. For example, system 202 may determine from a lookup table in state vector information 221 the location, velocity, and acceleration of entity 107. In some examples, the position information is based on the most recent position information received from the entity 107 system 202

Figure 7:
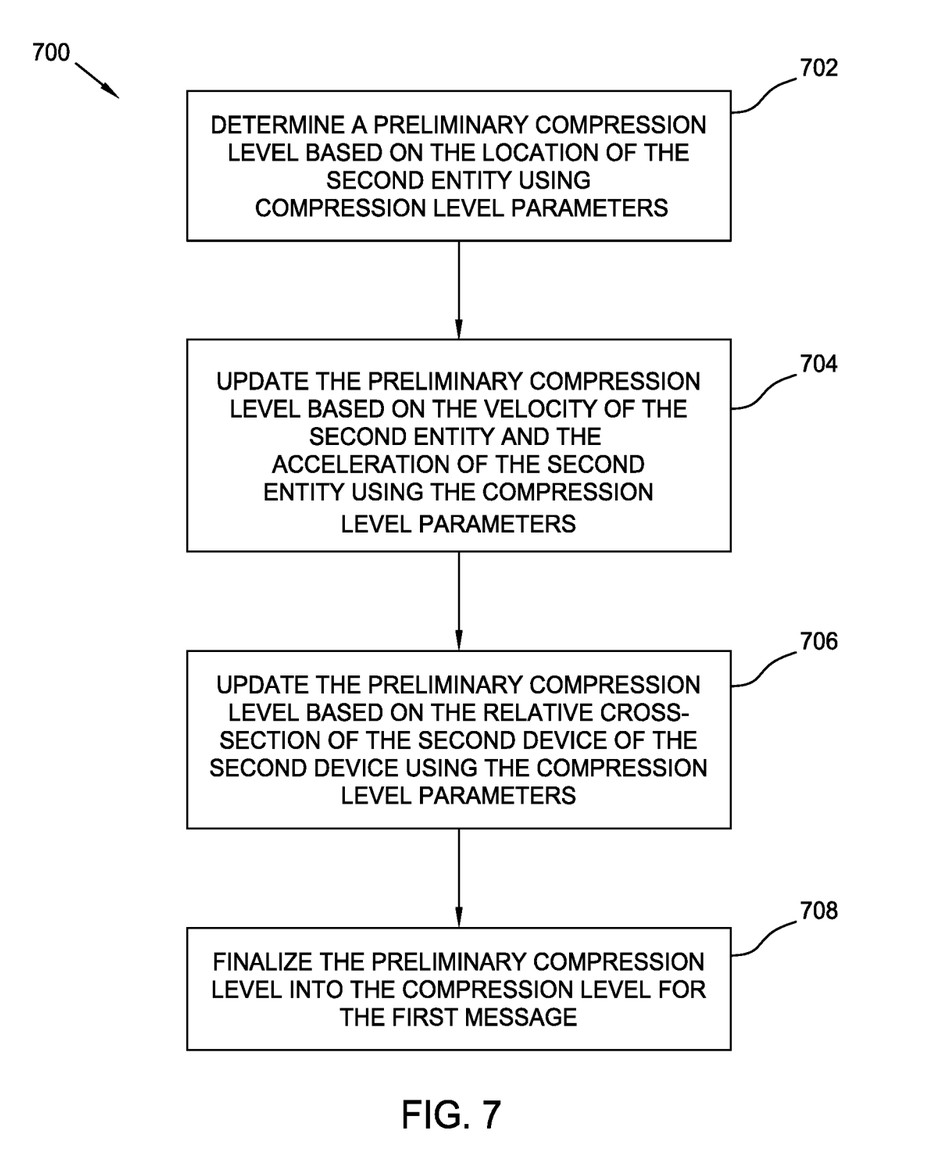
FIG. 7 is a flowchart illustrating determining a compression level for a message, according to one embodiment described herein.

FIG. 7 is a flowchart illustrating determining a compression level for a message, according to one embodiment described herein. In some examples, method 700 is a method for determining, based upon the position and orientation of the second entity, a compression level for the first message, as described in relation to FIG. 4 block 410. Method 700 begins at block 702, where the compression module 211 determines a preliminary compression level based on the location of the second entity using compression level parameters. For example, system 202 may determine, using compression level parameters 223 and the determined location information of entity 107 (along with position information of the entity 102), that the entity 107 is at a location far enough away from the location of the entity 102 that a high level of compression can be used to reduce the amount of data sent between the entity 102 and entity 107 in message 300. In an example where there are four compression levels, the preliminary compression level may be set as a high level of compression or a level 4 compression. In another example, system 202 may determine, using compression level parameters 223, that the entity 105c is also at a location far enough away from the location of the entity 102 that a high level of compression can be used to reduce the amount of data sent between the entity 102 and the entity 105c, resulting in a preliminary compression level such as a level 4 compression.

Method 700 continues at block 704, where the compression module 211 updates the preliminary compression level based on the velocity of the second entity and the acceleration of the second entity using the compression level parameters. For example, system 202 may determine, using compression level parameters 223, that the entity 107 has a velocity and acceleration 124 that indicates that the position of the entity 107 relative to entity 102 is not going to significantly change within a heartbeat or several heartbeats of the simulation. In this example, the compression level will be updated, but stay at the level 4 compression. In contrast, system 202 may determine, using compression level parameters 223 and the determined velocity and acceleration, that the entity 106 has a velocity and acceleration 123 that indicates that the position of the entity 106 may significantly change relative to entity 102, such that a lower level of compression is needed. In this example, the level 4 compression may be lowered to preserve fidelity of the data to a level 3 or level 2 compression.

Method 700 continues at block 706, where the compression module 211 updates the preliminary compression level based on the relative cross-section of the second entity of the second entity using the compression level parameters. In some examples, the orientation of the entity is needed to adequately execute the simulation and render each entity on monitoring screens (e.g., position and radar monitors) at the entities in the environment 100. System 202 then determines the appropriate level of compression needed for entity 107 based on the orientation of the entity 102 and the entity 107.

Method 700 continues at block 708, where the compression module 211 finalizes the preliminary compression level into the compression level for the first message. For example, system 202, after factoring in the position, orientation, and other information of the state vector determines the compression level needed for the message 300.

Figure 8:
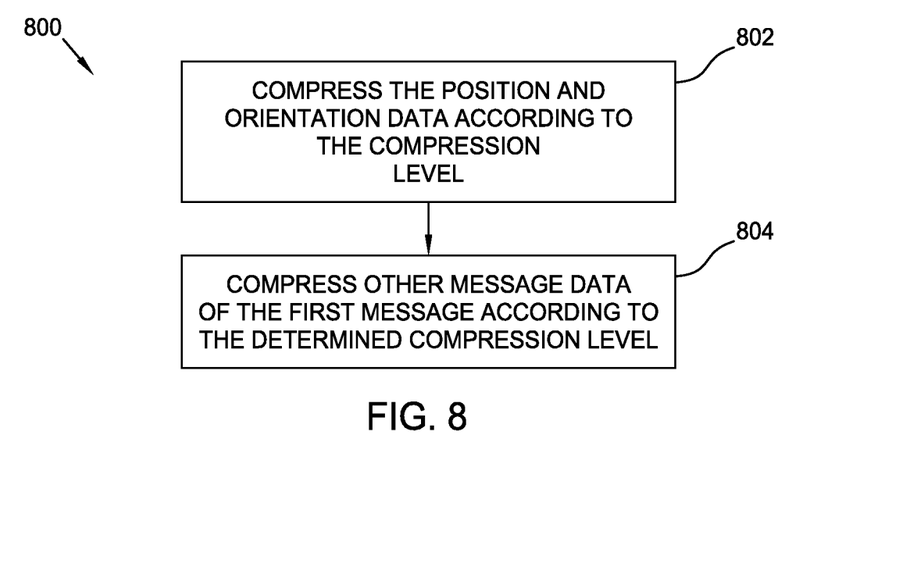
FIG. 8 is a flowchart illustrating compressing a message, according to one embodiment described herein.

FIG. 8 is a flowchart illustrating compressing a message, according to one embodiment described herein. In some examples, method 800 is a method for compressing the first message according to the compression level, as described in relation to FIG. 4 block 410. Method 800 begins at block 802, where the compression module 211 compresses the state vector data according to the compression level. For example, system 202 compresses the state vector information according to the determined compression level described in relation to FIGS. 4 and 7, (e.g., level 4 compression). In some examples, each component of the state vector may be compressed according to a determined compression level. For example, the position information may be compressed at a first level and orientation information may be compressed at a second level according to the determined compression levels.

Method 800 continues at block 804, where the compression module 211 compresses other message data of the first message according to the determined compression level. For example, system 202 may compress simulation information 306 and identification information 308 according to the compression level. In some examples, the simulation information 306 may require a higher fidelity such that the compression level, e.g., level 4 compression, may not compress the simulation information 306 at the same rate other data in message 300 is compressed. In another example, identification information 308 may be static and can be highly compressed at each level of compression in order to conserve network resources.

Figure 9:
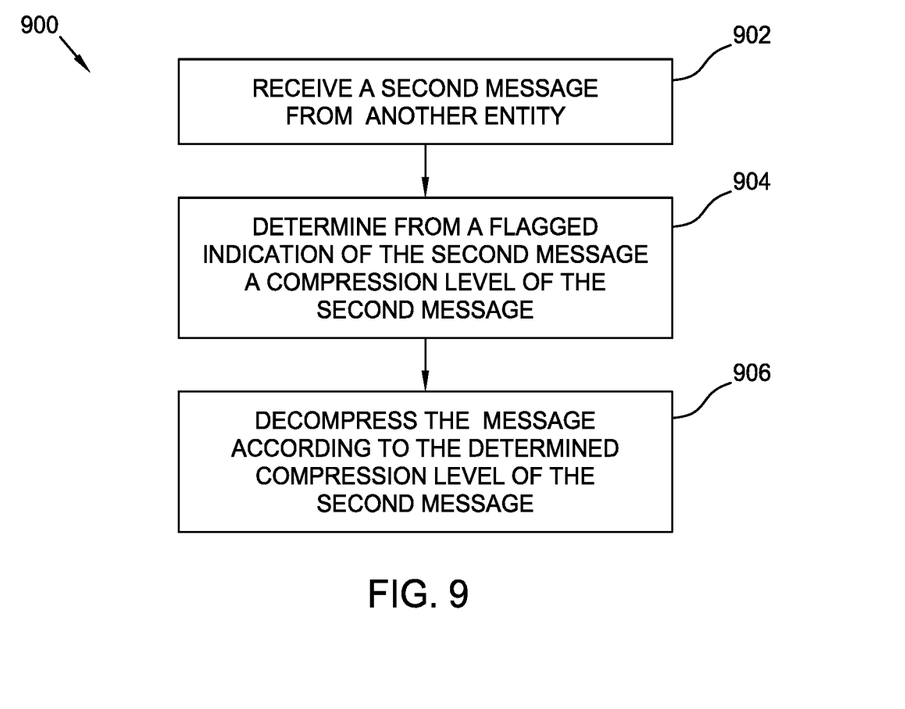
FIG. 9 is a flowchart illustrating receiving and decompressing a message, according to one embodiment described herein.

FIG. 9 is a flowchart illustrating receiving and decompressing a message, according to one embodiment described herein. Method 900 begins at block 902, where the applications and system functions module 212 receives a second message from another entity. For example, entity 102 receives a message from entity 107. The entity 102 will also receive a message from each of the other entities 103-106 during each heartbeat of the simulation executing in the environment 100.

Method 900 continues at block 904 and 906, where the compression module 211 determines from a flagged indication of the second message a compression level of the second message and decompresses the message according to the determined compression level of the second message. For example, system 202 may determine from an indication in the received message similar to compression indication 302, the compression level the other entity applied to the message. The system 202, then using compression level information 222 decompresses the message received from the other entities. In some examples, system 202 then updates the state vector information 221 and other simulation information according to the data received in the message.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As described above, including in relation to FIG. 2, various computing components may be included to perform the methods described herein. For example, bus 250 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, server 201 typically includes a variety of computer system readable media. Such media may be any available media that is accessible by server 201, and it includes both volatile and non-volatile media, removable and non-removable media.

Memory 210 can include computer system readable media in the form of volatile memory, such as random access memory (RAM) and/or cache memory. Server 201 may further include other removable/non-removable, volatile/non-volatile computer system storage media. In some examples, storage system 220 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), Digital versatile disc-read only memory (DVD-ROM) or other optical media can be provided. In such instances, each can be connected to bus 250 by one or more data media interfaces.

As depicted and described above, memory 210 may include at least one program product having a set (e.g., at least one) of program modules 215 that are configured to carry out the functions of embodiments of the invention. Server 201 may further include other removable/non-removable volatile/non-volatile computer system storage media. In some examples, storage system 220 may be included as part of memory 210 and may typically provide a non-volatile memory for the networked computing entities, and may include one or more different storage elements such as Flash memory, a hard disk drive, a solid state drive, an optical storage entity, and/or a magnetic storage entity.

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other entities to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other entities to cause a series of operational steps to be performed on the computer, other programmable apparatus or other entities to produce a computer implemented process such that the instructions which execute on the computer or other programmable apparatus provide processes for implementing the functions/acts specified in the flowchart and/or block diagram block or blocks.

One or more embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., entity 102) or related data available in the cloud. For example, one or both of the compression module 211 and the applications and system functions module could execute on a computing system in the cloud. In such a case, each module could access data stored at a storage location in the cloud, and could store associated data in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method for message data compression comprising:
   generating, at a first entity, a first message destined for a plurality of entities;
   determining, based upon a state vector corresponding to a second entity of the plurality of entities, a compression level for the first message, wherein the state vector comprises at least position information of the second entity, wherein the position information comprises a geographical location of the second entity, a velocity of the second entity, an acceleration of the second entity, and an angular acceleration of the second entity, wherein the second entity is a priority entity;
   compressing the first message according to the compression level; and
   sending the compressed first message to the plurality of entities.

2. The method of claim 1, wherein the first entity and the plurality of entities are participating entities in a live simulation environment and wherein generating, at the first entity, the first message destined for the plurality of entities comprises:
   receiving data to be transmitted from one or more applications of the first entity;
   determining a message heartbeat for the live simulation environment, wherein the first message is to be sent to the plurality of entities according to the message heartbeat; and
   compiling the received data into the first message.

3. The method of claim 1, wherein determining the compression level for the first message comprises:
   determining, from a lookup table at the first entity, the position information of the second entity.

4. The method of claim 3, wherein determining, based upon the state vector of the second entity, the compression level for the first message comprises:

determining a preliminary compression level based on the location of the second entity using compression level parameters, updating the preliminary compression level based on the velocity of the second entity, the acceleration of the second entity, and the angular acceleration of the second entity using the compression level parameters; and finalizing the preliminary compression level into the compression level for the first message.

5. The method of claim 1, wherein determining the compression level for the first message is further based on a status of the second entity.

6. The method of claim 1, wherein compressing the first message according to the compression level comprises:
compressing state vector data according to the compression level; and
compressing other message data of the first message according to the compression level.

7. The method of claim 1, further comprising
receiving a second message from another entity of the plurality of entities;
determining from a flagged indication of the second message a compression level of the second message; and
decompressing the second message according to the determined compression level of the second message.

8. A system for message data compression, comprising:
a processor; and
a memory storing a program, which, when executed on the processor, performs an operation, the operation comprising:
generating, at a first entity, a first message destined for a plurality of entities;
determining, based upon a state vector corresponding to a second entity of the plurality of entities, a compression level for the first message, wherein the state vector comprises at least position information of the second entity, wherein the position information comprises a geographical location of the second entity, a velocity of the second entity, an acceleration of the second entity, and an angular acceleration of the second entity, wherein the second entity is a priority entity;
compressing the first message according to the compression level; and
sending the compressed first message to the plurality of entities.

9. The system of claim 8, wherein the first entity and the plurality of entities are participating entities in a live simulation environment and wherein generating, at the first entity, the first message destined for the plurality of entities comprises:
receiving data to be transmitted from one or more applications of the first entity;
determining a message heartbeat for the live simulation environment, wherein the first message is to be sent to the plurality of entities according to the message heartbeat; and
compiling the received data into the first message.

10. The system of claim 8, wherein determining the compression level for the first message comprises:
determining, from a lookup table at the first entity, the position information of the second entity.

11. The system of claim 10, wherein determining, based upon the position and orientation of the second entity, the compression level for the first message comprises:

determining a preliminary compression level based on the location of the second entity using compression level parameters, updating the preliminary compression level based on the velocity of the second entity and the acceleration of the second entity using the compression level parameters; and finalizing the preliminary compression level into the compression level for the first message.

12. The system of claim 8, wherein determining the compression level for the first message is further based on a status of the second entity.

13. The system of claim 8, wherein compressing the first message according to the compression level comprises:
compressing state vector data according to the compression level; and
compressing other message data of the first message according to the compression level.

14. The system of claim 8, the operation further comprising
receiving a second message from another entity of the plurality of entities;
determining from a flagged indication of the second message a compression level of the second message; and
decompressing the second message according to the determined compression level of the second message.

15. A computer program product for message data compression, the computer program product comprising:
a non-transitory computer-readable storage medium having computer-readable program code embodied therewith, the computer-readable program code executable by one or more computer processors to perform an operation, the operation comprising:
generating, at a first entity, a first message destined for a plurality of entities;
determining, based upon a state vector corresponding to a second entity of the plurality of entities, a compression level for the first message, wherein the state vector comprises at least position information of the second entity, wherein the position information comprises a geographical location of the second entity, a velocity of the second entity, an acceleration of the second entity, and an angular acceleration of the second entity, wherein the second entity is a priority entity;
compressing the first message according to the compression level; and
sending the compressed first message to the plurality of entities.

16. The computer program product of claim 15, wherein the first entity and the plurality of entities are participating entities in a live simulation environment and wherein generating, at the first entity, the first message destined for the plurality of entities comprises:
receiving data to be transmitted from one or more applications of the first entity;
determining a message heartbeat for the live simulation environment, wherein the first message is to be sent to the plurality of entities according to the message heartbeat; and
compiling the received data into the first message.

17. The computer program product of claim 15, wherein determining the compression level for the first message comprises:
determining, from a lookup table at the first entity, the position information of the second entity.

18. The computer program product of claim 17, wherein determining, based upon the position and orientation of the second entity, the compression level for the first message comprises:

determining a preliminary compression level based on the location of the second entity using compression level parameters, updating the preliminary compression level based on the velocity of the second entity and the acceleration of the second entity using the compression level parameters; and finalizing the preliminary compression level into the compression level for the first message.

19. The computer program product of claim 15, wherein compressing the first message according to the compression level comprises:

compressing state vector data according to the compression level; and compressing other message data of the first message according to the compression level.

20. The computer program product of claim 15, the operation further comprising receiving a second message from another entity of the plurality of entities;

determining from a flagged indication of the second message a compression level of the second message; and decompressing the second message according to the determined compression level of the second message.

\* \* \* \* \*